United States Patent
Barrenscheen et al.

(10) Patent No.: US 7,907,431 B2
(45) Date of Patent: Mar. 15, 2011

(54) DEVICES AND METHODS FOR CONVERTING OR BUFFERING A VOLTAGE

(75) Inventors: Jens Barrenscheen, Munich (DE); Marcus Nuebling, Esting (DE); Werner Roessler, Neufahrn (DE)

(73) Assignee: Infineon Technologies AG, Neubiberg (DE)

( * ) Notice: Subject to any disclaimer, the term of this patent is extended or adjusted under 35 U.S.C. 154(b) by 290 days.

(21) Appl. No.: 12/182,012

(22) Filed: Jul. 29, 2008

(65) Prior Publication Data
US 2010/0027303 A1   Feb. 4, 2010

(51) Int. Cl.
*H02M 3/335* (2006.01)
*H02M 7/44* (2006.01)

(52) U.S. Cl. ............. 363/124; 363/132; 363/17; 363/98

(58) Field of Classification Search ................. 363/124, 363/132, 17, 98
See application file for complete search history.

(56) References Cited

U.S. PATENT DOCUMENTS

| | | | |
|---|---|---|---|
| 4,598,330 A | 7/1986 | Woodworth | |
| 4,857,822 A * | 8/1989 | Tabisz et al. | 323/282 |
| 4,959,746 A | 9/1990 | Hongel | |
| 5,081,558 A | 1/1992 | Mahler | |
| 5,532,919 A * | 7/1996 | Gegner | 363/124 |
| 5,594,635 A * | 1/1997 | Gegner | 363/124 |
| 5,822,563 A | 10/1998 | Sitbon et al. | |
| 5,917,722 A * | 6/1999 | Singh | 363/132 |
| 6,108,225 A * | 8/2000 | Iwahori et al. | 363/98 |
| 6,211,701 B1 | 4/2001 | Kuijk et al. | |
| 6,259,235 B1 * | 7/2001 | Fraidlin et al. | 323/222 |
| 6,512,352 B2 * | 1/2003 | Qian | 323/282 |
| 6,621,668 B1 | 9/2003 | Sare | |
| 6,671,142 B2 | 12/2003 | Beckert et al. | |
| 6,741,435 B1 | 5/2004 | Cleveland | |
| 6,807,073 B1 * | 10/2004 | Scarlatescu | 363/34 |
| 6,834,002 B2 * | 12/2004 | Yang | 363/89 |
| 7,066,749 B2 | 6/2006 | Borrego Bel et al. | |
| 7,079,363 B2 | 7/2006 | Chung | |
| 7,259,945 B2 | 8/2007 | Cleveland | |
| 7,342,754 B2 | 3/2008 | Fitzgerald et al. | |
| 7,385,791 B2 | 6/2008 | Ness | |

* cited by examiner

*Primary Examiner* — Bao Q Vu

(74) *Attorney, Agent, or Firm* — Slater & Matsil, L.L.P.

(57) ABSTRACT

Embodiments of the invention relate to devices and methods for converting or buffering a voltage including an inductor configured to perform at least a primary function and to be reused to contribute to converting or buffering the voltage as a secondary function.

25 Claims, 4 Drawing Sheets

DEVICES AND METHODS FOR CONVERTING OR BUFFERING A VOLTAGE

TECHNICAL FIELD

The present invention relates generally to devices and methods for converting or buffering a voltage.

BACKGROUND

Today, in many technical fields and particularly in power supply systems for vehicles, various electrical components are used to perform a variety of different functions such as communication interfacing, switching of higher electrical powers or fast switching, as for instance in an inverter for an electric motor.

The above mentioned various electrical components often require additional supply voltages which may be generated from a primary power supply such as a battery or high power battery of a vehicle.

In the following, for illustration purposes, the invention will be described with reference to a device for converting and buffering a voltage for supplying the converted or buffered voltage to at least one of the above mentioned various electrical components in a vehicle, for instance, a variety of electronic switches in a hybrid electric vehicle.

However, the invention is not so limited and may find its application in conjunction with any other type of electrical components for which a voltage should be converted or buffered on the basis of a power supply which supplies an unsuitable voltage for the respective component or which breaks down such that the buffered voltage may at least temporarily supply certain of the electrical components.

Typically, in a vehicle, for the purpose of converting voltages to supply electrical components with a different voltage with respect to the supply voltage of a battery as a power supply, capacitively working voltage converters based on charge pumps are used, since these may be built with a small number of low cost external components such as, e.g., storage capacitors.

However, the number of switching transistors in such charge pumps is often relatively high and the energy efficiency of the voltage conversion is relatively low, in particular in a case, where charge has to be pumped over multiple stages. Since external inductors are normally more expensive than simple capacitors, in practice, inductively working voltage converters based on such expensive external inductors are only employed for higher currents.

For these or other reasons, there is a need for the present invention.

SUMMARY OF THE INVENTION

Devices and methods for converting or buffering a voltage are provided, substantially as shown in and/or described in connection with at least one of the figures.

Further features and advantages of the present invention will become apparent from the following detailed description of the invention made with reference to the accompanying drawings.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

DETAILED DESCRIPTION OF ILLUSTRATIVE EMBODIMENTS

In the following detailed description, reference is made to the accompanying drawings, which form a part thereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

According to an embodiment, a device may be configured to convert or buffer a voltage provided by a power supply, such as, e.g., a battery. The device may comprise an inductor configured to perform at least one primary function within a circuit and may further be configured to be reused to contribute to converting or buffering the voltage as a secondary function.

In an embodiment, the device may be configured to drive a modulated current through the inductor to generate a converted voltage for supplying a consumer load. A consumer load may comprise different electrical components which may require a supply voltage which differs from the supply voltage of the power supply. In certain embodiments, the current driven through the inductor may be pulse-width-modulated.

In a further embodiment, the device may be configured to convert an energy stored in the inductor to provide a buffered voltage for supplying a consumer load.

In certain embodiments of the device, the inductor may be a coil of a relay wherein one primary function of the coil of the relay is to switch a contact of the relay.

In many applications in the automotive area or in industry, relays are used to allow for securely creating or removing an electrical connection between various electrical devices. This particularly holds for cases in which higher powers have to be switched, since the higher complexity involved with electronic switches, such as, e.g., Field Effect Transistor (FETs), Insulated Gate Bipolar Transistors (IGBTs) and thyristors, leads to higher costs as compared to using the well-known and cost-optimized relays.

Furthermore, using a relay as a switch provides an advantage with respect to the power dissipation during the on-state of the relay, i.e., with respect to conduction losses in the parasitic series resistance of the switch in its on-state. For example to switch a current of about 100 A at a voltage of about 300 V as in the case of a battery main switch in a hybrid electric vehicle, a simple relay at a price level of about $1.50 with an on-state resistance of about 0.5 mΩ yields an on-state power-dissipation of as low as about 5 W. However, using an IGBT as a switch under the same conditions involves an on-state power dissipation loss which may be more than one order of magnitude higher than using the above mentioned relay switch.

Figure 1:
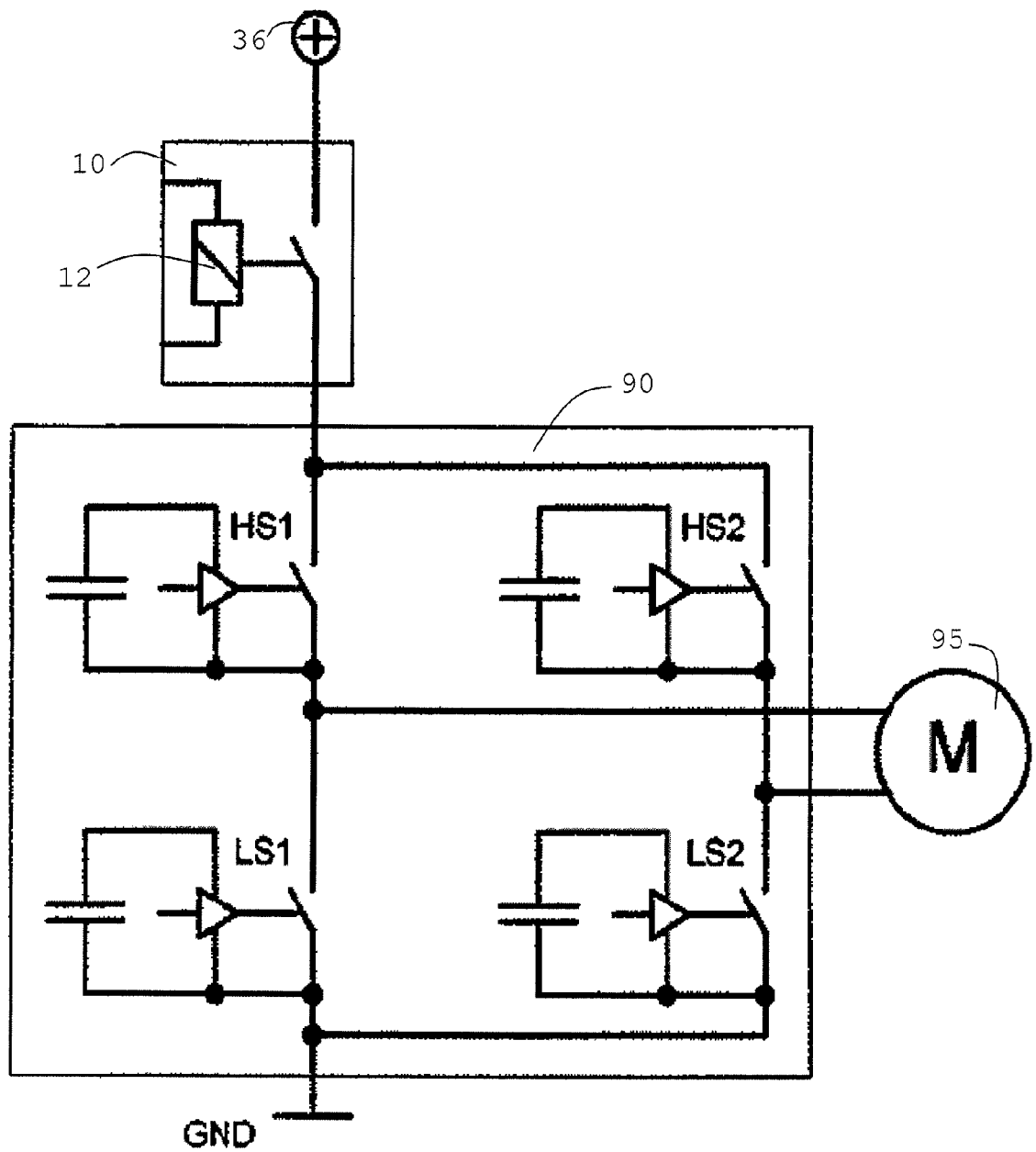
FIG. 1 shows a schematic circuit diagram according to an embodiment of the invention wherein the coil of a relay is reused as part of a voltage converter for supplying the high-side switches of an inverter for an electric motor, wherein the coil of the relay primarily acts as part of a main switch for the inverter (H-bridge circuit)

FIG. 1 shows an example of an application for a device according to an embodiment of the invention for converting a voltage wherein a coil 12 of a relay 10 may be reused as part of a voltage converter for supplying the high-side switches HS1 and HS2 of an inverter 90 for an electric motor 95, wherein the coil 12 of the relay 10 primary acts as part of a main switch for the inverter 90.

As depicted in FIG. 1, a typical example for the inverter 90 may be an H-bridge circuit for controlling the direction and speed of rotation of the electric motor 95, wherein the H-bridge circuit may be coupled to the positive supply terminal 36 via the relay 10. In this embodiment, the positive supply terminal 36 acts as a high power supply terminal for the electric motor 95. Hence, the relay 10 fulfils a security function allowing to switch off the direct current electric motor 95 via a separate switching device even if the H-bridge circuit inverter 90 has a defect and may no longer switch off the electric motor 95. This architecture is an example for increasing security by introducing redundancy.

In an application according to FIG. 1, there may be the need that the supply voltage of the high-side switches HS1 and HS2 should be, e.g., about 10 to 15 V higher than the voltage at the positive supply terminal 36. For the purpose of generating a voltage with any duty cycle between about 0% and about 100% for the direct current electric motor 95, a conventional bootstrap capacitor may not be used without any further measures in order to generate the voltage higher than the voltage at the positive supply terminal 36 for the high-side switches HS1 and HS2, since using this bootstrap capacitor would limit the achievable duty cycle range. As a result, generating a suitable supply voltage for the high-side switches HS1 and HS2 would normally involve using an additional voltage converter typically based on charge pumps as described above.

However, according to the embodiment as indicated in FIG. 1, the coil 12 of the relay 10 may be reused as part of an inductively working voltage converter, to render the above mentioned additional capacitively working voltage converter or an external expensive inductor for a standard inductively working voltage converter obsolete.

Hence, in the embodiment of the device shown in FIG. 1, the coil 12 of a relay 10 may be used as the inductor of the device which may be configured to be at least indirectly coupled to the positive supply terminal 36 and to the two high-side switches HS1 and HS2 of the inverter 90 for supplying the two high-side switches HS1 and HS2 with a voltage higher than the voltage at the positive supply terminal 36 for achieving any predetermined duty cycle between about 0% and about 100% for the high-side switches HS1 and HS2 of the inverter 90.

Moreover, the supply of the low-side switches LS1 and LS2 in embodiments according to FIG. 1 may be generally provided by the respective circuit driving the low-side switches LS1 and LS2 in case of the relatively high supply voltage in industrial applications. However, in case of the typically relatively low supply voltages in vehicles, the supply of the low-side switches LS1 and LS2 in embodiments according to FIG. 1 may be generally provided by the positive supply terminal of the power supply. The power supply for the primary side of the relay 10 may be normally provided by the same supply voltage domain as for the low-side switches LS1 and LS2.

In certain embodiments, the device may be configured to use an energy stored in the coil of the relay for causing an electronic switch to operate.

In these embodiments, a problem comparable to the one in the embodiment of FIG. 1 may arise in switching applications for electric or hybrid electric vehicles, in which a relay serves as a main battery switch between the power electronic components and the battery, which may comprise a series of accumulator cells. The power electronic components may, e.g., comprise a high power inverter and a high power electric motor. The above mentioned applications may give rise to currents and voltages as in the above mentioned example for a power dissipation estimation for the on-state power loss of a relay as a main battery switch. Since these high currents and voltages may result in considerable switching stress for the mechanical contacts of the relay, so far, special relays typically with a shielding gas have been used for preventing electric arcs from occurring and for guaranteeing a certain lifespan of the relay as a battery switch.

Since these special relays are often comparatively expensive for being special and complex components, a power semiconductor switch may be used in parallel to the switched contacts of a standard relay for performing the actual switching operation. In this case, the function of the standard relay may be to reduce the power dissipation in the on-state of whole switching assembly which comprises the power semiconductor switch and the standard relay.

Figure 2:
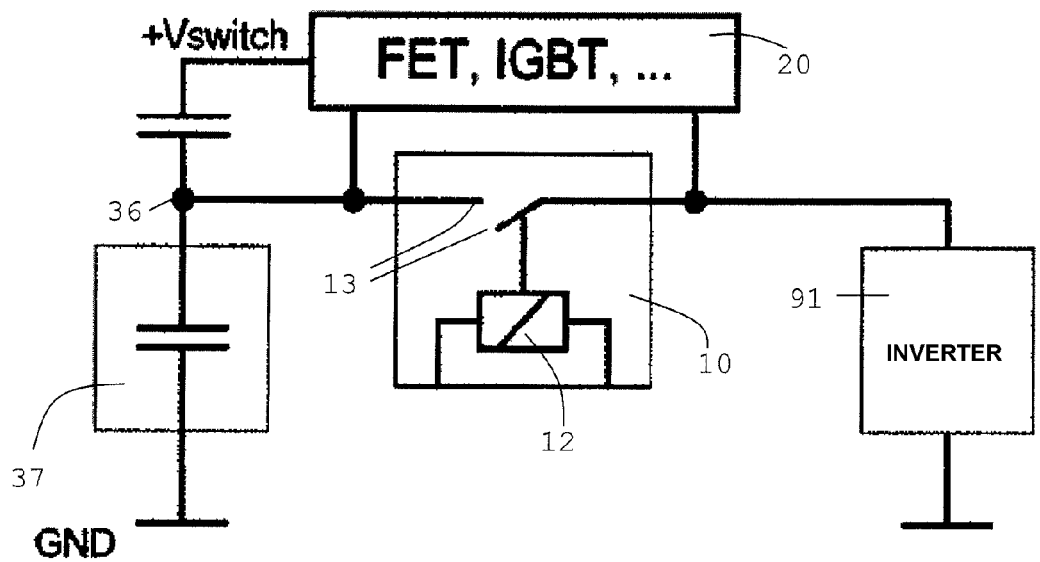
FIG. 2 shows a schematic circuit diagram according to a further embodiment of the invention, wherein the coil of a relay is reused as part of a voltage buffer for supplying an electronic switch parallel to the relay and wherein the coil of the relay primarily acts as part of a main switch for an inverter.

A corresponding embodiment is depicted in FIG. 2. As shown, this embodiment may comprise the relay 10 with its switched contacts 13 connected in parallel to the power semiconductor switch 20 such as a FET, an IGBT or the like. The relay 10 and the power semiconductor switch 20 may be connected between an inverter 91 and a positive supply terminal 36 of a battery 37. Similar to the high-side switches HS1 and HS2 in the embodiment of FIG. 1, the power semiconductor switch 20 may need switching voltages Vswitch to operate, which are higher than the voltage at the positive supply terminal 36.

Hence, in an embodiment according to FIG. 2, the coil 12 of the relay 10 may be reused as part of a voltage converter to provide the power semiconductor switch 20 with a switching voltage Vswitch, which is higher than the voltage at the positive supply terminal 36.

In certain embodiments according to FIG. 2, the contacts 13 of the relay 10 may not be caused to close by the coil 12 of the relay 10, unless the power semiconductor switch 20 has already been switched on, and, as a result, the voltage across the power semiconductor switch 20 is low, or if there is no current flowing through the contacts 13 of the relay 10 which results in a reduced switching stress of the relay 10. In this case, the power semiconductor switch 20 performs the actual switching functionality, whereas the function of the relay 10 is rather to reduce the overall on-state resistance between the positive supply terminal 36 and the inverter 91.

In further embodiments according to FIG. 2, an energy stored in the coil 12 of the relay 10, due to a current flowing through the coil 12, may be used to trigger or supply the power semiconductor switch 20 to switch on when the relay 10 is about to disconnect the battery 37 from the inverter 91. In this way, the power semiconductor switch 20 may take over the current through the contacts 13 of the relay 10, if the current through the coil 12 of the relay 10 is switched off to disconnect the contacts 13 of the relay 10.

As a result, due to the mechanical inertia of the contacts 13 of the relay 10, the power semiconductor switch 20 may be switched on, using the energy stored in the coil 12 of the relay 10, before the contacts 13 of relay 10 are actually disconnected. The closed power semiconductor switch 20 in turn leads to a low voltage across the contacts 13 of the relay 10 which again results in a reduced switching stress for the relay 10. Hence, in this case, the relay 10 performs the actual switching functionality, whereas the function of the power semiconductor switch 20 is to reduce the voltage across the contacts 13 of the relay 10 during its switch off operation to reduce the switching stress for the contacts 13.

The latter described functionality can even be provided when the main power supply by the battery 37 breaks down. In this case, the breakdown of the current through the coil 12 of the relay 10 induces a voltage across the contacts 13 of the coil 12 of the relay 10 which may be used to trigger or supply the switch on operation of the power semiconductor switch 20.

Thus, the above described examples show that embodiments of the invention may use the energy stored in the coil of a relay for the generation of additional supply voltages different from the voltage provided by a power supply or, e.g., for security reasons, for buffering a voltage to supply predetermined parts of a circuit in case of a breakdown of the primary supply voltage.

A further embodiment of the invention relates to a relay driver wherein the coil of the relay is reused for converting or buffering a voltage provided by a power supply.

In applications in which a relay is primarily used as a power switch to provide a switching functionality with a low on-state power dissipation, the topology and the mode of operation of the relay driver may be configured to provide the primary function of driving and operating the relay by supplying an operating current and a holding current, and the secondary functionality of converting a voltage, e.g., of boosting the primary supply voltage to provide an additional supply voltage. In further embodiments, the relay driver may be configured to supply, for example, a microcontroller, which may control the above mentioned H-bridge circuit.

In contrast to the above, in present relay drivers, the focus is on driving a relay in a low-loss way. Accordingly, the generation of the energy needed to supply logic blocks with additional voltages has not yet been considered together with the relay driver functionality. However, even if a lower degree of efficiency of the actual relay driver functionality may result in doing so, the overall degree of efficiency of the system may increase considerably if an inductively working voltage converter is used instead of the commonly used capacitively working charge pumps. In addition, in case of an integrated relay driver, the above measure may reduce the required silicon area in comparison to a voltage converter circuit which generates a comparable additional supply voltage with capacitive charge pumps.

Reusing the coil of a relay as an inductor for a voltage converter may be applied in applications in which a relay is used anyway. The mechanical inertia of the contacts of the relay may be considered as an important aspect for this multiple usage of the coil of a relay. In particular, this mechanical inertia of the contacts of the relay may have an extent such that smaller fluctuations of the current through the coil of the relay do not lead to any limitations for the actual relay functionality. Therefore, a coil of a relay driven by a, e.g., pulse-width-modulated current may easily be integrated into the topology of a voltage converter.

The considerably better energy efficiency of such an inductive voltage converter compared to capacitively working charge pumps leads to the additional advantage of a reduced loss of heat which has to be dissipated from a corresponding relay driver integrated into an IC.

In an embodiment, the relay driver may be configured to provide the energy stored in the coil of the relay such that certain, particularly critical, parts of a circuit are provided with the stored energy instead of using an external large capacity to store this energy. In particular, in case of unintentional disconnections of the relay driver from its voltage supply, e.g., in the case of an accident, the coil of the relay may serve as an energy storage. This may provide an important security feature which allows for using comparatively small capacitors and, as a result, leads to a cost advantage.

Thus, certain embodiments may be configured to detect predetermined operation conditions in the above described easy way, and may be configured to cause predetermined reactions to these operation conditions, as, for example, to provide certain parts of a circuit with the remaining energy stored in the coil of a relay.

For illustration purposes, it may be referred again to an example of an electronic switch connected in parallel to the switched contacts of a relay. Once a soon drop out of the relay is signalized by a voltage induced in the coil of the relay due to the corresponding breakdown of the current through the coil of the relay, the electronic switch may be closed with the help of the energy stored in the coil of the relay even if the actual voltage supply of the relay driver breaks down. The electronic switch may be switched off, as soon as the relay has dropped out.

Hence, in certain embodiments, the function of a relay driver may be combined with the function of an inductive voltage converter. An algorithm for controlling the current through the coil of the relay may be configured to provide the desired switching functionality of the relay by a current which causes the relay to operate (operating current) and a current which causes the relay to hold (holding current). Furthermore, the algorithm may be configured to increase and modulate the current through the coil of the relay correspondingly in case of an increased current demand for the voltage converting functionality. As described above, with regard to the overall energetic efficiency, it may be more efficient to increase the current through the coil of the relay to provide the additional voltage converting functionality if, otherwise necessary, capacitive charge pumps can be avoided.

In the following, some basic topologies will be described for reusing an inductor such as a coil of a relay for converting a voltage. This means that no external or additional inductor is necessary, but rather an available inductor, e.g., the coil of a relay, is reused as energy storage. Certain embodiments may comprise smaller modifications of the basic topologies to combine the primary function, e.g., the switching functionality of a relay, with the secondary function of converting or buffering a voltage.

In other embodiments, parts of the basic topologies may be combined with each other in a different way. However, the reused inductor may further replace an external or additional inductor to build up a voltage converter topology.

Figure 3:
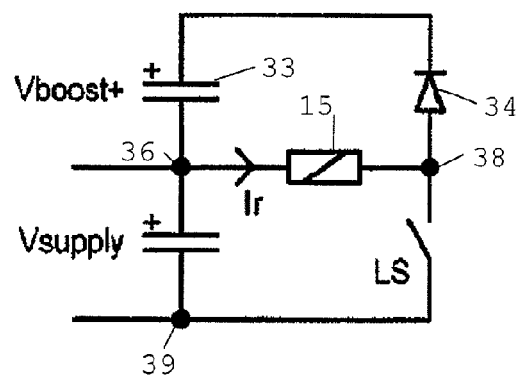
FIG. 3 shows a schematic circuit diagram according to a further embodiment of the invention wherein an inductor is reused for generating a positive boost voltage.

FIG. 3 shows a schematic circuit diagram of a device according to an embodiment embedded into a basic topology for a voltage converter wherein an inductor 15, e.g., a coil of a relay, is reused for generating a positive boost voltage Vboost+. As shown, the device may comprise a low-side switch LS, a positive supply terminal 36, a switched terminal 38 and a negative supply terminal 39. In this embodiment, the reused inductor 15 may be coupled between the positive supply terminal 36 and the switched terminal 38. The low-side switch LS may be coupled between the switched terminal 38 and the negative supply terminal 39.

In the embodiment shown in FIG. 3, the device may further comprise a first diode 34 and a boost capacitor 33. The first diode 34 may be coupled with its anode to the switched terminal 38 and with its cathode to a first terminal of the boost capacitor 33. A second terminal of the boost capacitor 33 may be coupled to the positive supply terminal 36.

The operation of the embodiment shown in FIG. 3 may be divided into two main cycles. In a first cycle the low-side switch LS may be closed and the current Ir may circulate from the positive supply terminal 36 through the inductor 15 via the low-side switch LS to the negative supply terminal 39. The first diode 34 may block any charge stored on the first terminal of the boost capacitor 33 to discharge via the switched terminal 38 and the inductor 15 to the second terminal of the boost capacitor 33.

A second cycle of operation of the embodiment in FIG. 3 may start once the low-side switch LS is switched off, and, as a result, a voltage is induced in the inductor 15 which acts against the change in the current through the inductor 15 caused by removing the current path via the low-side switch LS. Just after switching off the low-side switch LS, the induced voltage forces the current Ir to continue to flow in the same direction through the inductor 15 as compared to the situation before the low-side switch LS was switched off. In this second cycle, the first diode 34 is forward-biased and may provide a path for the current Ir to continue to flow and charge the boost capacitor 33.

Through the connection of the second terminal of the boost capacitor 33 to the positive supply terminal 36, the voltage across the boost capacitor 33 is referenced to the voltage at the positive supply terminal 36. Hence, the first terminal of the boost capacitor 33 may be used to supply a consumer load with a voltage boosted, i.e., higher, by the amount of Vboost+, with regard to the supply voltage Vsupply.

Figure 4:
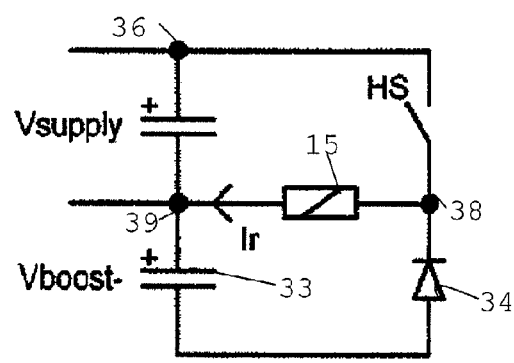
FIG. 4 shows a schematic circuit diagram according to a further embodiment of the invention wherein an inductor is reused for generating a negative boost voltage.

FIG. 4 shows a schematic circuit diagram of a device according to an embodiment embedded into a basic topology for a voltage converter wherein an inductor 15, e.g., a coil of a relay, is reused for generating a negative boost voltage Vboost−. As shown, the device may comprise a high-side switch HS, a positive supply terminal 36, a switched terminal 38 and a negative supply terminal 39. In this embodiment, the reused inductor 15 may be coupled between the negative supply terminal 39 and the switched terminal 38. The high-side switch HS may be coupled between the switched terminal 38 and the positive supply terminal 36.

Also in the embodiment shown in FIG. 4, the device may further comprise a first diode 34 and a boost capacitor 33. Here, the first diode 34 may be coupled with its cathode to the switched terminal 38 and with its anode to a first terminal of the boost capacitor 33. A second terminal of the boost capacitor 33 may be coupled to the negative supply terminal 39.

As in the case of the embodiment shown in FIG. 3, the operation of the embodiment shown in FIG. 4 may be divided into two main cycles. In a first cycle the high-side switch HS may be closed and the current Ir may circulate from the positive supply terminal 36 via the high-side switch HS through the inductor 15 to the negative supply terminal 39. The first diode 34 may block any charge stored on the first terminal of the boost capacitor 33 to discharge via the switched terminal 38 and the inductor 15 to the second terminal of the boost capacitor 33.

A second cycle of operation of the embodiment in FIG. 4 may start once the high-side switch HS is switched off, and, as a result, a voltage is induced in the inductor 15 which acts against the change in the current through the inductor 15 caused by removing the current path via the high-side switch HS. Just after switching off the high-side switch HS, the induced voltage forces the current Ir to continue to flow in the same direction through the inductor 15 as compared to the situation before the high-side switch HS was switched off. In this second cycle, the first diode 34 is forward-biased and may provide a path for the current Ir to continue to flow and charge the boost capacitor 33.

Through the connection of the second terminal of the boost capacitor 33 to the negative supply terminal 39, the voltage across the boost capacitor 33 is referenced to the voltage at the negative supply terminal 39. Hence, the first terminal of the boost capacitor 33 may be used to supply a consumer load with a voltage boosted, i.e., lower, by the amount of Vboost−, with regard to the supply voltage Vsupply.

In an embodiment in which a coil of a relay is reused as the inductor 15 for the voltage converting function, the coil of the relay may be driven by a current Ir which is positive in the direction as indicated in FIG. 3 as well as by a current Ir which is positive in the direction as indicated in FIG. 4, since the mechanical switching functionality of the relay does not depend on the direction of the current through the coil of the relay.

Figure 5:
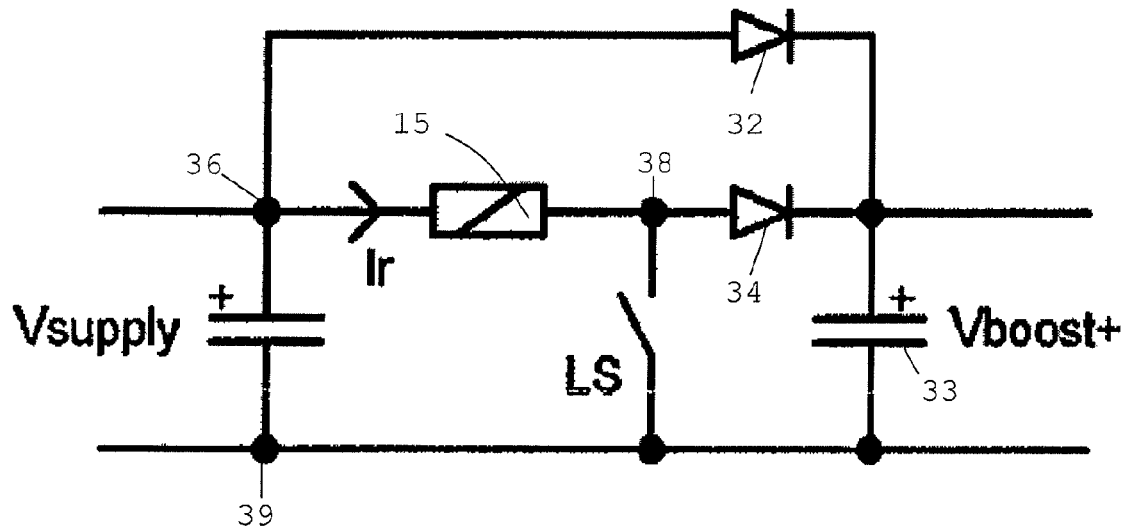
FIG. 5 shows a schematic circuit diagram of a further embodiment of the invention wherein an inductor is reused for buffering a supply voltage domain.

FIG. 5 shows a schematic circuit diagram of a further embodiment of the invention wherein an inductor 15 is reused for buffering a voltage in a supply voltage domain Vboost+. With respect to the embodiment in FIG. 3, besides the first diode 34 and the boost capacitor 33, the device may further comprise a second diode 32. In this embodiment, the first diode 34 may be coupled with its anode to the switched terminal 38 and with its cathode to a first terminal of the boost capacitor 33. The second diode 32 may be coupled with its anode to the positive supply terminal 36 and with its cathode to the first terminal of the boost capacitor 33. A second terminal of the boost capacitor 33 may be coupled to the negative supply terminal 39.

Hence, FIG. 5 shows a device according to an embodiment of the invention embedded into an alternative topology which is particularly suited for buffering a supply voltage for parts of a circuit which should be supplied independent of the supply voltage Vsupply. Optionally, the voltage Vboost+ may be converted to a lower voltage with a subsequent voltage converter.

The energy stored in the inductor 15, e.g., the coil of the relay, may be stored in the capacitor 33 of the Vboost+ supply voltage domain after the relay has been switched off. This energy may be used to provide an extended buffering of the voltage in the Vboost+ supply voltage domain even if the supply voltage Vsupply has already greatly decreased. Thereby, in particular just after switching off the inductor 15, the voltage Vboost+ may rise above the supply voltage Vsupply. This initially increased voltage may gradually decrease by the supply of a consumer load in the Vboost+ supply voltage domain.

The second diode 32 connected in parallel to the inductor 15 and the first diode 34 allows for an operation of the circuit in the supply voltage domain Vboost+ even if the inductor 15 is driven by a current with a duty cycle of 100%, i.e., a current which is not modulated. In this case, the energy stored in the inductor 15 may be provided for buffering the voltage in the Vboost+ supply voltage domain after the low-side switch LS has been switched off.

Figure 6:
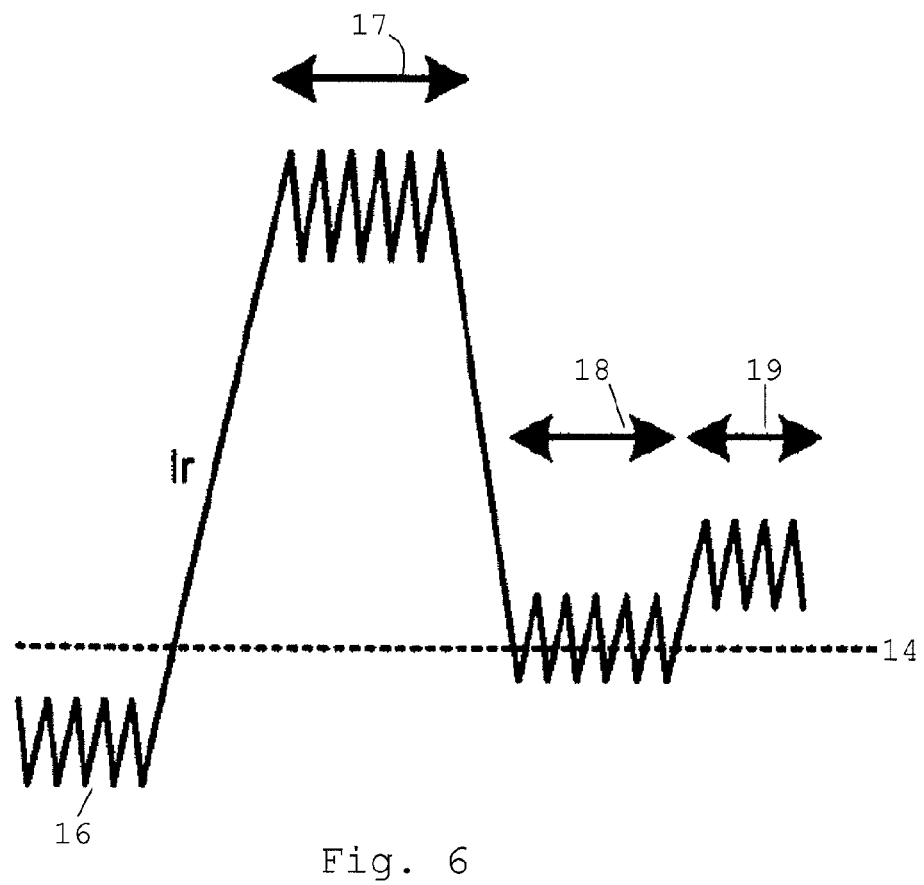
FIG. 6 shows a simplified transient current characteristic diagram of a current through a device according to an embodiment of the invention in different operation modes.

FIG. 6 shows a simplified transient current characteristic diagram of a current through an inductor as part of a device according to an embodiment of the invention in different operation modes. In the shown case, the device may, e.g., comprise the coil of a relay which is reused as the inductor. The simplified transient current characteristic for the current Ir through the coil of the relay represents, for the sake of simplicity in a chronological order, different modes of operation of the device. The simplification in FIG. 6 relates to the linearly displayed current characteristic and the only in principle displayed current thresholds, which do not reflect qualitative relations between these current thresholds.

In the mentioned chronological order of the operation modes as shown in FIG. 6, the relay may be switched off in the beginning. Also in this first operation mode of the device, a relay quiescent current 16 may be pulse-width-modulated, as indicated in FIG. 6 by the triangular shaped characteristic, for achieving a boost effect, i.e., a voltage converting effect. In other words, as long as the mean value of the relay quiescent current 16 remains sufficiently below the threshold of a relay operation current 17, a voltage conversion may be performed by the coil of the relay even if the relay is not operated. As shown in a second section of the current characteristic in FIG. 6, the relay may only operate if the current Ir through the coil of the relay exceeds the threshold of the relay operating current 17 for a predetermined period of time.

As shown in a third section of the current characteristic in FIG. 6, the current through the coil of the relay may then be reduced to a first relay holding current 18 without causing a drop out of the relay. In FIG. 6, the relay holding current 18 is shown for the case of a first load in the Vboost+ supply voltage domain, wherein the term load here refers to the current consumption in the Vboost+ supply voltage domain.

In the case shown in FIG. 6, this first load is that low such that the minimal relay holding current 14 as indicated by the dashed line may suffice to allow for the voltage conversion.

As shown in a fourth section of the current characteristic in FIG. 6, the current through the coil of the relay may be increased to a second relay holding current 19 if an increased second load in the Vboost+ supply voltage domain shall be supplied with a sufficient amount of energy.

Present characteristics of a current through the coil of a relay which depend on the load in a supply voltage domain boosted by the coil of the relay like the one shown in FIG. 6 have not been implemented yet using present relay drivers. In fact, when using a present relay driver, the current through the coil of the corresponding relay is typically 0 if the relay is switched off. However, based on a, e.g., pulse-width-modulated relay quiescent current 16 as described above, a boost operation, i.e., a voltage conversion function may be possible up to a certain load in the Vboost+ supply voltage domain reusing the coil of the relay.

Hence, certain embodiments may comprise a relay exhibiting a comparatively high relay operation current in order to effect a voltage conversion for the Vboost+ supply voltage domain using the coil of the relay even in cases in which the relay is not operated. For these embodiments, an analysis of the frequency of switching operations of the relay may be expedient with the corresponding load currents in the boosted supply voltage domain to find a suitable modulated relay quiescent current for a corresponding operating point.

Hence, in the above mentioned embodiments, the device according to an embodiment of the invention may be configured to drive one of a modulated relay quiescent current, a modulated relay operating current or a modulated relay holding current through the coil of the relay to generate a converted voltage for supplying a consumer load independent of a switching state of the relay.

Thus, still with regard to FIG. 6, using the coil of a relay as a reused inductor has the effect that the primary function of the inductor, namely the switching of the relay, and the secondary function, namely the voltage converting function, may be designed to be independent of each other. One reason for this independence between the primary function and the secondary function of the coil as an inductor is that the relay may always be designed such that the threshold of the relay operation current 17 and/or the minimal relay holding current 14 have a desired and suitable level. This may be done by choosing the mechanical, e.g., the strength of a spring biasing a movable one of the contacts of the relay, or the electrical characteristics of the relay, e.g. the number of windings of the coil of the relay, accordingly.

Figure 7:
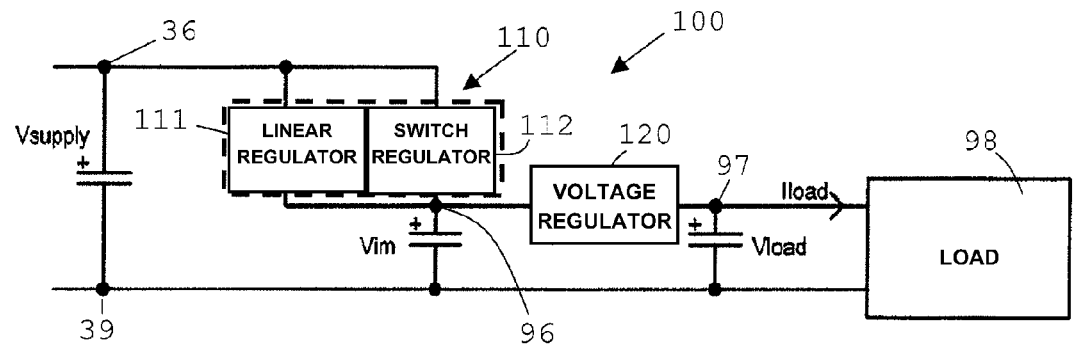
FIG. 7 shows a schematic circuit diagram wherein a device according to a further embodiment of the invention may be used as part of a buck converter for a multistage voltage converter.

FIG. 7 shows a schematic circuit diagram wherein a device according to a further embodiment of the invention may be embedded into a different voltage converter topology, namely the topology of a buck converter for a multistage voltage converter 100. The circuit according to FIG. 7 may be used to generate a supply voltage for a control logic which, e.g., may be based on a microcontroller or the like.

In an embodiment, the multistage voltage converter 100 may comprise a first voltage converter 110 comprising a switching regulator 112 which comprises a device according to an embodiment of the invention to provide an intermediate voltage Vim. Furthermore, the multistage voltage converter 100 may comprise a second voltage converter 120 comprising a first linear regulator with the intermediate voltage Vim as input voltage to provide a load voltage Vload at a load terminal 97.

In an embodiment of the multistage voltage converter 100, the first voltage converter 110 may further comprise a second linear regulator 111. In this embodiment, the multistage voltage converter 100 may be adapted to switch the first voltage converter 110 between the switching regulator 112 and the second linear regulator 111 to provide the intermediate voltage Vim at the intermediate terminal 96.

Starting from a primary supply voltage Vsupply in the embodiment of FIG. 7, e.g., 12-14 V in a vehicle, the intermediate voltage Vim is generated. In case the switching regulator 112 of the first voltage converter is inactive, the second linear regulator 111 may be used to convert Vsupply to Vim. The second voltage converter 120 comprising the first linear regulator may serve to convert Vim to the actual output voltage Vload to a predetermined value, e.g. 3,3-5 V, for a load 98. Without a switching regulator, the degree of efficiency of a circuit as shown in FIG. 7 is limited since a power amounting to Iload*(Vsupply−Vload) is dissipated in the first and second linear regulators.

However, the use of a clocked, i.e., a switching regulator instead of the second linear regulator 111 as the first voltage converter 110 for taking up the largest part of the voltage difference, in the shown case Vsupply−Vim, may increase the degree of efficiency enormously, since only a smaller part of power amounting to Iload*(Vim−Vload) is dissipated in the first linear regulator as part of the second voltage converter 120.

The fact that multistage conversion is used, which introduces the intermediate voltage Vim, may have the purpose of flattening the remaining ripple of the output voltage of the switching regulator 112 for the load 98. In a topology according to FIG. 7, in case of a comparatively small load 98 or in case the coil of a relay used as an inductor for the switching regulator 112 is completely switched off, i.e., currentless, the load 98 may be supplied by the first and second linear regulators 111 only, while the switching regulator 112 is correspondingly switched off.

In contrast, in case of a higher load 98 and/or in case the coil of the relay is driven by a modulated current, the second linear regulator 111 may be switched off, since the switching regulator 112 may then generate the intermediate voltage Vim in a more efficient way.

Figure 8:
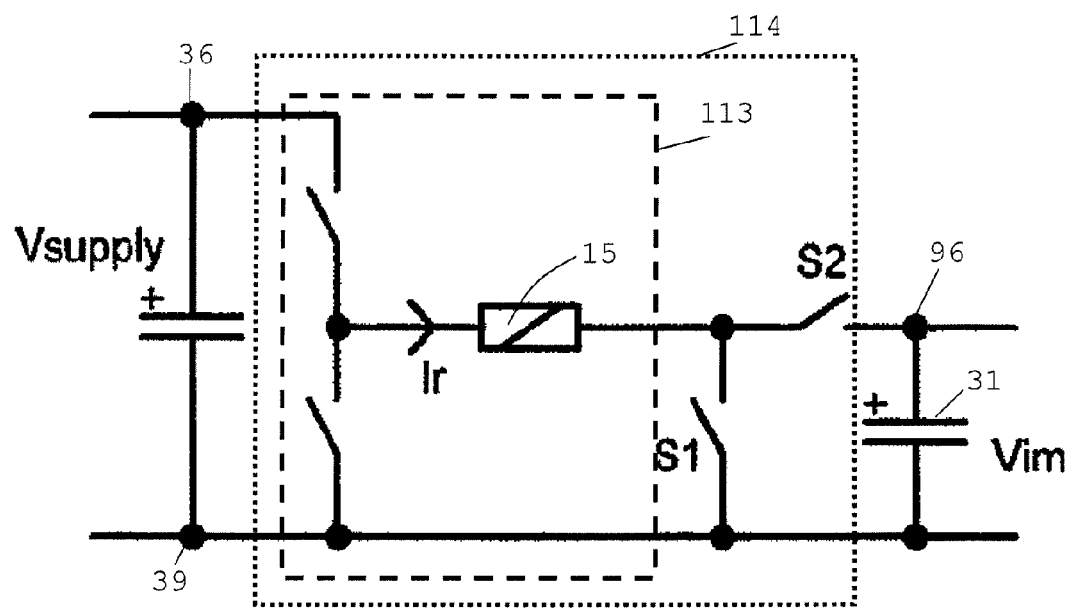
FIG. 8 shows a schematic circuit diagram wherein a device according to a further embodiment of the invention may be used as part of an enhanced buck converter.

As mentioned before, also in the embodiment as shown in FIG. 7, a coil of a relay may be used as an inductor and hence as energy storage for the switching regulator 112, as shown in a buck converter topology in FIG. 8 which may be used as the switching regulator 112.

In such a case, in contrast to conventional buck converters, the decision whether the second linear regulator 111 or the switching regulator 112 should be used to generate the intermediate voltage Vim may depend on the load 98 and the switching state of the relay. For instance, the intermediate voltage Vim may be generated by the second linear regulator 111 in case the relay is switched off or in cases depending on the load 98 such that a relay which is switched off is not caused to operate because of a too high current through the coil of the relay.

In a further embodiment, a mixed mode in the form of a current division between the second linear regulator 111 and the switching regulator 112 may be provided, which may however sometimes involve further complexity for controlling the switching regulator 112 and the second linear regulator 111.

Furthermore, in a buck converting topology wherein the coil of a relay is reused as inductor for the switching regulator, it should be considered that the voltage across the coil of the relay may only amount to Vsupply−Vim. This may be counteracted by using a relay with a smaller nominal voltage.

Now referring to FIG. 8, a schematic circuit diagram is shown wherein a device according to a further embodiment of the invention may be used as part of an enhanced buck converter 114.

As shown in FIG. 8, the buck converter 114 comprises a switching regulator 113 which comprises the device according to an embodiment as described above to provide the intermediate voltage Vim at the intermediate terminal 96. The buck converter 114 may further comprise a first switch S1 to connect the inductor 15 of the device to the negative supply terminal 39, and a second switch S2 to connect the inductor 15 of the device to the intermediate terminal 96. In certain embodiments, the negative supply terminal 39 may be a ground terminal.

By the introduction of the additional switches S1 and S2 into a standard buck converter topology it may be achieved that the full amount of the supply voltage Vsupply is provided for operating the relay to the coil of the relay reused as the inductor 15. Furthermore, in cases of loads of the buck converter 114 which require smaller currents as the minimum relay holding current, a part of the current Ir through the coil of the relay may be directed to negative supply terminal 39 instead of being directed to the back-up capacitor 31 for the intermediate voltage Vim. In the operated state of the relay, the voltage difference Vsupply−Vim may be used to provide the relay holding current.

Furthermore, it should be considered that the load current passes through the internal resistance of the coil of the relay and may lead to a voltage drop and hence to a deterioration of the degree of efficiency with respect to a standard buck converter topology with an external low-resistance coil.

In as much as this voltage drop does not rise to the range of Vsupply−Vim, with regard to FIG. 7, the use of a buck converter as switching regulator 112 may be more favorable from an energy point of view as compared to the use of a further linear regulator such as the second linear regulator 111 in the embodiment in FIG. 7.

In a further embodiment of the multistage voltage converter 100 as shown in FIG. 7, the first voltage converter 110 may comprise the buck converter 114 as shown in FIG. 8 as the switching regulator 112.

A further embodiment of the invention relates to a means for converting or buffering a voltage comprising an inductor means for performing at least a primary function and for contributing to converting or buffering the voltage as a secondary function.

In an embodiment, the above mentioned means may be configured to provide an energy stored in the inductor means for buffering the voltage to supply a security relevant consumer load in case of a supply voltage breakdown.

A further embodiment of the invention relates to a method comprising reusing an inductor with at least one primary function for converting or buffering a voltage.

In an embodiment, the method further comprises driving a modulated current through the inductor to generate a converted voltage for supplying a consumer load.

In a further embodiment, the method further comprises using an energy stored in the inductor for triggering at least one safety measure.

In another embodiment, the method further comprises converting an energy stored in the inductor to provide a buffered voltage for supplying a consumer load.

A still further embodiment of the invention relates to a method comprising using an energy stored in a coil of a relay to boost or buffer a voltage supplied to a consumer load.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device comprising:
    a relay comprising an inductor and a mechanical contact, wherein the inductor performs a primary function of switching the mechanical contact of the relay and a secondary function of converting or buffering a voltage.

2. The device of claim 1, wherein the device is configured to drive a modulated current through the inductor to generate a converted voltage for supplying a consumer load.

3. The device of claim 1, wherein the device is configured to convert an energy stored in the inductor to provide a buffered voltage for supplying a consumer load.

4. The device of claim 1, wherein the inductor comprises a coil of the relay.

5. The device of claim 4, wherein the device is configured to use an energy stored in the coil of the relay for causing an electronic switch to operate.

6. The device of claim 4, wherein the device is configured to drive one of a modulated relay quiescent current, a modulated relay operating current or a modulated relay holding current through the coil of the relay to generate a converted voltage for supplying a consumer load independent of a switching state of the relay.

7. The device of claim 4, further comprising a relay driver.

8. The device of claim 1, wherein the inductor is configured to be at least indirectly coupled to a supply terminal and at least one electronic switch for supplying the at least one electronic switch with a voltage different from a voltage at the supply terminal.

9. The device of claim 8 wherein the at least one electronic switch comprises at least one high-side switch, wherein the supply terminal is a positive supply terminal, and wherein the device is configured to be coupled to an inverter of an electric motor for supplying the at least one high-side switch as part of the inverter with a voltage higher than a voltage at the positive supply terminal for achieving any predetermined duty cycle between 0-100% for the at least one high-side switch of the inverter.

10. The device of claim 1, further comprising:
a low-side switch;
a positive supply terminal;
a switched terminal; and
a negative supply terminal,
wherein the inductor is coupled between the positive supply terminal and the switched terminal, and
wherein the low-side switch is coupled between the switched terminal and the negative supply terminal.

11. The device of claim 1, further comprising:
a high-side switch;
a positive supply terminal;
a switched terminal; and
a negative supply terminal,
wherein the inductor is coupled between the negative supply terminal and the switched terminal, and
wherein the high-side switch is coupled between the positive supply terminal and the switched terminal.

12. The device of claim 10, further comprising:
a first diode; and
a boost capacitor,
wherein the first diode is coupled with its anode to the switched terminal and with its cathode to a first terminal of the boost capacitor, and
wherein a second terminal of the boost capacitor is coupled to the positive supply terminal.

13. The device of claim 11, further comprising:
a first diode; and
a boost capacitor;
wherein the first diode is coupled with its cathode to the switched terminal and with its anode to a first terminal of the boost capacitor, and
wherein a second terminal of the boost capacitor is coupled to the negative supply terminal.

14. The device of claim 12, further comprising:
a first diode;
a second diode; and
a boost capacitor,
wherein the first diode is coupled with its anode to the switched terminal and with its cathode to a first terminal of the boost capacitor,
wherein the second diode is coupled with its anode to the positive supply terminal and with its cathode to the first terminal of the boost capacitor, and
wherein a second terminal of the boost capacitor is coupled to the negative supply terminal.

15. A voltage converter comprising:
a relay comprising an inductor and a mechanical contact, wherein the inductor performs a primary function of switching the mechanical contact of the relay and a secondary function of converting a voltage; and
a switching regulator comprising the inductor to provide an intermediate voltage at an intermediate terminal.

16. The voltage converter of claim 15, further comprising:
a first switch to connect the inductor to a negative supply terminal; and
a second switch to connect the inductor to the intermediate terminal, wherein the voltage converter comprises a buck converter.

17. The voltage converter of claim 15, further comprising:
a first voltage converter comprising the switching regulator; and
a second voltage converter comprising a first linear regulator with the intermediate voltage as input voltage to provide a load voltage, wherein the voltage converter is a multistage voltage converter.

18. The voltage converter according to claim 17, further comprising:
a first switch to connect the inductor to a negative supply terminal; and
a second switch to connect the inductor to the intermediate terminal, wherein the first voltage converter comprises a buck converter.

19. The voltage converter according to claim 17, wherein the first voltage converter further comprises a second linear regulator and wherein the voltage converter is adapted to switch the first voltage converter between the switching regulator and the second linear regulator to provide the intermediate voltage.

20. A device comprising:
inductor means for performing at least a primary function of switching a mechanical contact of a relay and for contributing to converting or buffering a voltage as a secondary function.

21. The device of claim 20, wherein the device is configured to provide an energy stored in the inductor means for buffering the voltage to supply a security relevant consumer load in case of a supply voltage breakdown.

22. A method comprising:
reusing an inductor with at least one primary function of switching a mechanical contact of a relay for a secondary function of converting or buffering a voltage.

23. The method of claim 22, further comprising:
driving a modulated current through the inductor to generate a converted voltage for supplying a consumer load.

24. The method of claim 22, further comprising:
using an energy stored in the inductor for triggering at least one safety measure.

25. The method of claim 22 further comprising:
converting an energy stored in the inductor to provide a buffered voltage for supplying a consumer load.

* * * * *